United States Patent Office 2,877,162
Patented Mar. 10, 1959

2,877,162

11α-HYDROXYLATION OF STEROIDS BY SPOROTRICHUM

Peter D. Meister, Kalamazoo Township, Kalamazoo County, Mich., and Adolph Weintraub, Brooklyn, N. Y., assignors to The Upjohn Company, Kalamazoo, Mich., a corporation of Michigan No Drawing. Application October 21, 1957
Serial No. 691,161

11 Claims. (Cl. 195—51)

The present invention relates to a novel process for the fermentative oxidation of steroids, and more particularly to the 11α-hydroxylation of steroids and/or 17-side chain degradation.

The instant application is a continuation in part of application Serial No. 605,410, filed August 21, 1956, now abandoned.

The steroid compounds fermentatively oxidized in accordance with this invention are those containing up to and including 22 carbon atoms and having the basic nucleus of 10,13-dimethylcyclopentanopolyhydrophenanthrene of the formula:

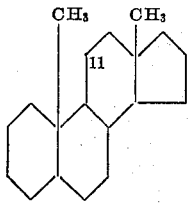

In order to obtain hydroxylation on the 11-position, the 11-position, as shown above, must be a methylene group.

The process of the present invention comprises: subjecting a steroid to the action of a fungus of the known genus Sporotrichum to 11α-hydroxylate the steroids amenable thereto, that is steroids having an 11-methylene group, and additionally, or alternatively where the 11-position is no longer amenable to oxygenation, oxidizing the 17-side chain of pregnanes to produce the 17β-hydroxyandrostanes. For side-chain oxidation an aeration rate of at least five liters of air per minute to 100 liters of fermentation medium (5%) is required. Alternatively, by reducing the aeration rate to about one percent (one liter of air per minute to 100 liters of medium) selective 11α-hydroxylation in steroids with 17-side-chains is obtained without fermentative removal of the side chain.

Degradation of the 17-side chain of steroid compounds by drastic chemical means with low yield is well known. In the instant process, however, the yield is high, the essential sole operative step is simple, and it is advantageous that the 11-methylene position is simultaneously oxygenated to produce an 11α-hydroxysteroid. Not only is the instant process a novel and useful method of producing oxidized steroids, but the efficiency of the Sporotrichum exceeds that of other fungi in the 11-oxygenation of substrates such as 1-dehydrosteroids and in steroids of the androstane series. A further advantage of Sporotrichum-steroid oxidation is that by-products are minimized as compared with other steroid-hydroxylating organisms.

It is an object of the present invention to provide a novel and efficient method for oxidizing steroids by means of fungi of the genus Sporotrichum. It is a further object to 11-hydroxylate 11-methylene steroids particularly of the pregnane and androstane series. Another object is the 17-side-chain oxidative degradation of steroids of the pregnane series to produce corresponding 17β-hydroxyandrostanes.

In performing the process of the present invention the selected steroids substrate, suitably dissolved in a solvent such as acetone, dimethylformamide or the like, is subjected to a growth of a species of fungus of the genus Sporotrichum or the oxidative enzymes thereof. The genus Sporotrichum according to Clements and Shear, Genera of Fungi, Hafner Publishing Co., New York, 1954, belongs to the family Moniliaceae of the order Moniliales of the class Deuteromycetes (Fungi Imperfecti). Tested members of the genus Sporotrichum, useful as herein described, include the species *Sporotrichum sulfurescens* A. T. C. C. 7159 (catalogue number of American Type Culture Collection), *Sporotrichum carnis* A. T. C. C. 11501, *Sporotrichum carnis* A. T. C. C. 15507, *Sporotrichum epigaeum* A. T. C. C. 7145, *Sporotrichum bombycinum* A T. C. C. 7139, *Sporotrichum folicola* Oud., *Sporotrichum pulviniforme* Thom, *Sporotrichum olivaceum* Fr., *Sporotrichum globuliferum*, *Sporotrichum maritimum*, *Sporotrichum anthophilum*, *Sporotrichum griseolum*, *Sporotrichum roseolum* Oud. et Beijerinck *Sporotrichum poae* PK., *Sporotrichum equi*, Sporotrichum Beurmanni M. et Ram. and Sporotrichum Schencckii, A. T. C. C. 10268 and the like.

The technique of fermentation, including media, inoculation procedure, addition of substrate are in general as shown for example by Murray and Peterson, U. S. Patents 2,721,828 and 2,602,769.

However, the rate of aeration in the fermentation is critical in its effect upon the degradation of the substrate. Low rates of oxygen, e. g., for *Sporotrichum sulfurescens* about 0.5 to two liters of air per minute per 100 liters of fermentation medium produces only 11α-oxygenation without fermentative degradation of the 17-side-chain in pregnane compounds. For fermentative side-chain degradation greater oxygen supply rates and/or higher temperatures and sometimes longer reaction times are necessary. At an aeration rate of five liters or more per minute per 100 liters of medium, degradation of the 17-side-chain in pregnane compounds with *Sporotrichum sulfurescens* at twenty to 28 degrees centigrade is obtained. For 11α-oxygenation of steroids having no 17-side-chain, the aeration rate is not critical and from 0.5 to ten to twenty liters of air per minute per 100 liters of medium can be used.

In regard to the optimum conditions of 11α-hydroxylation of steroids, it has been found that after inoculation of the reaction vessel with the selected Sporotrichum species a period of 24 to 72 hours of growth should be allowed before addition of the steroid. Shorter periods of growth, while operative, substantially reduce the yield. The optimum temperature for the growth is twenty to 28 degrees centigrade, though a range from fifteen to 32 degrees centigrade is operative. Before the steroid is added, it has been found advantageous to lower the temperature to about twenty degrees. When it is desired to avoid side-chain degradation, a reaction period of about 24 hours and aeration of 0.5 to two liters per minute per 100 liters of medium has been found most suitable for the different Sporotrichum species. If however, side-chain removal is desired as well as 11α-hydroxylation, or no side-chain is present, higher oxygen rates, five to twenty liters per minute per 100 liters of medium, and longer reaction periods, 24 to 96 hours, are more suitable.

The following examples are illustrative of the process of the present invention, but are not to be construed as limiting.

EXAMPLE 1

*11α,17β-dihydroxy-17α-methyl-1,4-androstadien-3-one (11α-hydroxy-1-dehydromethyltestosterone)*

One hundred liters of a medium containing one percent Cerelose dextrose, two percent corn steep liquor (sixty percent solids), and tap water, was adjusted to a pH of five with 25 percent sodium hydroxide solution. Thereto was added 400 milliliters of lard oil-octadecanol (containing about one percent octadecanol) as an antifoaming agent. This medium was sterilized for 45 minutes at twenty pounds pressure and inoculated with six liters of a 24-hour growth of *Sporotrichum sulfurescens* v. Beyman, which strain was obtained from Centraalbureau voor Schimmelcultur, Baarn, Holland. The medium was agitated with a sweep stirrer at 200 R. P. M., and sterile air admitted through a sparger at a rate of two liters per minute. After a period of 24 hours, sixteen grams of 1-dehydromethyltestosterone containing nine percent methyltestosterone, dissolved priorly in 200 milliliters of hot absolute ethanol, was added. The pH was now 4.8. The fermentation was stopped after 24 hours the pH being then 5.1. The beer was filtered through a 20-inch Knight-Ware vacuum filter. The tank and filter were washed with twenty liters of water. The mycelium on the filter was dried with two portions of twelve liters of acetone and extracted with two portions of twelve liters of methylene chloride. The beer filtrate was extracted once with 24 liters of methylene chloride, a second time with the 48 liters of extract from the mycelium-cake extraction, and twice more with 24 liters each of methylene chloride. The combined beer extracts were washed with twelve liters of two percent sodium bicarbonate, once with 24 liters of water, and dried with anhydrous sodium sulfate. The dry extract was concentrated in a precision flash evaporator to approximately one liter, then to dryness under an exhaust hood door. The dry residue weighed 330 grams. It was dissolved in 780 milliliters of benzene and run through an alumina column (the alumina—1000 grams—was acid washed and dried at 120 degrees centigrade). Eluate fractions of 780 milliliters were taken as shown in Table I.

TABLE I

| Fraction No. | Solvent | Volume in milliliters | Solid weight in grams |
|---|---|---|---|
| 1-2 | Benzene | 1,560 | 250.49 |
| 3-4 | Benzene—10% Ether | 1,560 | 6.07 |
| 5-6 | Benzene—30% Ether | 1,560 | 5.61 |
| 7 | Benzene—50% Ether | 780 | 2.15 |
| 8 | do | 780 | 1.81 |
| 9 | Ether | 780 | 6.13 |
| 10 | do | 780 | 14.99 |
| 11 | Ether—5% Chloroform | 780 | 4.08 |
| 12 | do | 780 | 1.35 |
| 13 | Ether—10% Chloroform | 780 | 0.38 |
| 14 | do | 780 | 0.18 |
| 15 | Ether—30% Chloroform | 780 | 0.18 |
| 16 | do | 780 | 0.25 |
| 17 | Ether—50% Chloroform | 780 | 0.42 |
| 18 | do | 780 | 1.14 |
| 19 | Chloroform | 780 | 0.74 |
| 20 | do | 780 | 0.25 |
| 21 | Chloroform—5% Acetone | 780 | 7.50 |
| 22 | Acetone | 780 | 8.05 |
| 23 | Methanol | 780 | 2.20 |

Fraction 22 was evaporated to give 8.05 grams of solids, then redissolved in a mixture consisting of 100 milliliters of ethyl acetate and fifty milliliters of methanol. This mixture was filtered, and the solution was concentrated to 35 milliliters to yield 5.52 grams of crystals of melting point 249.5 to 252.5. This material was recrystallized once more from seventy milliliters of methanol-ethyl acetate in a ratio of six to one to give 4.03 grams of crystalline 11α,17β-dihydroxy-17α-methyl-1,4-androstadien-3-one of melting point 250 to 253 and rotation $[\alpha]_D^{23}$ minus 33 degrees in chloroform;

$$\lambda_{max}^{alc.} \ 249 \ and \ 264$$

E 17,100 and 11,000; infrared: OH, 3640 cm.$^{-1}$; conjugated ketone 1660 cm.$^{-1}$; $\Delta^{1,4}$ C=C, 1617, 1600 cm.$^{-1}$, having anabolic activity in excess of methyltestosterone.

*Analysis.*—Calcd. for $C_{20}H_{28}O_3$: C, 75.91; H, 8.92. Found: C, 76.17; H, 9.15.

Identical results are obtained using *Sporotrichum sulfurescens*, American Type Culture Collection No. 7159 in the above example.

EXAMPLE 2

*11α,17β-dihydroxy-1,4-androstadien-3-one (11α-hydroxy-1-dehydrotestosterone)*

Fermenting a dispersion of three grams of 17β-hydroxy-1,4-androstadien-3-one (1-dehydrotestosterone) with *Sporotrichum sulfurescens* A. T. C. C. No. 7159 in twelve liters of medium as described in Example 1 followed by extraction, equivalently proportioned, as in Example 1, gave 9.2 grams of extractives which were dissolved in 220 milliliters of benzene and chromatographed over 350 grams of alumina. The chromatogram was developed with two 310-milliliter portions of the following solvents and solvent mixtures: benzene, benzene-50% ether, ether, ether-10% chloroform, ether-20% chloroform, ether-50% chloroform, chloroform, chloroform-10% acetone, chloroform-20% acetone, chloroform-50% acetone, acetone, acetone-10% methanol, acetone-20% methanol and methanol. Acetone-ten percent methanol fractions gave as the eluate residue 2.64 grams of crystalline material which was recrystallized twice from methanol-ether (1:1) to give 1.844 grams of 11α,17β-dihydroxy-1,4-androstadien-3-one. A portion of this was recrystallized twice more from chloroform-ether (1:1) to give analytically pure 11α-hydroxy-1-dehydrotestosterone, melting point 174–175.5 degrees centigrade; $[\alpha]_D$ minus seven degrees (C. 1.0 in chloroform);

$$\lambda_{max}^{alc.} \ 249 \ m\mu$$

E 17,100. Infrared spectrum confirmed the structure.

*Analysis.*—Calcd. for $C_{19}H_{26}O_3$: C, 75.46; H, 7.82. Found: C, 75.14; H, 8.91.

A mixture of 200 milligrams of 11α-hydroxy-1-dehydrotestosterone with twenty milliliters of dry pyridine and 0.6 milliliter of acetic anhydride was maintained at room temperature for 18 hours, then diluted with 200 milliliters of water and extracted five times with 100-milliliter portions of diethyl ether. The combined ether extract was washed with two percent hydrochloric acid, in fifty milliliter portions, once with fifty milliliters of water, once with fifty milliliters of two percent sodium bicarbonate, once again with fifty milliliters of water, dried with anhydrous sodium sulfate, filtered, and the solvent evaporated at room temperature to yield crude crystals which were twice recrystallized from ethyl acetate to give 206.7 milligrams of 11α,17β-diacetoxy-1,4-androstadien-3-one, melting point 227.5–228 degrees centigrade, $$\lambda_{max}^{alc.} \ 245 \ m\mu$$

E 17,800; $[\alpha]_D$ plus 47 degrees (C. 1.0 in chloroform). Infrared spectrum confirmed the structure.

*Analysis.*—Calcd. for $C_{23}H_{30}O_5$: C, 71.48; H, 7.82. Found: C, 71.80; H, 8.22.

EXAMPLE 3

*11α-hydroxy-1,4-androstadiene-3,17-dione*

To twelve liters of media containing 1.2 grams of corn-steep solid and one gram of commercial dextrose per hundred milliliters of water, made up to a pH of 4.5 with sodium hydroxide solution, and containing a 24-hour growth of *Sporotrichum bombycinum* A. T. C. C. No.

7139, there was added three grams of 1,4-androstadiene-3,17-dione, dissolved in 100 milliliters of acetone. After 24 hours' incubation with an aeration rate of one liter of air per minute, the beer and mycelium were extracted with methylene dichloride to give 6.18 grams of brown, oily solids. The solids were dissolved in 200 milliliters of benzene and chromatographed over 180 grams of alumina, and developed with 200-milliliter portions of chloroform (twice), chloroform-ten percent acetone (twice), and chloroform-thirty percent acetone. The combined eluate, 1.53 grams, was recrystallized twice from chloroform solution, by dilution with ether to induce crystallization, to yield 1.153 grams of 11α-hydroxy-1,4-androstadiene-3,17-dione, melting point 212–214 degrees centigrade, $[\alpha]_D$ plus 86.5 degrees (C. 1.01 in chloroform);

$\lambda_{max.}^{alc.}$ 248 m$\mu$

E=17,500. Infrared spectroscopy confirmed the structure.

*Analysis.*—Calcd. for $C_{19}H_{24}O_3$: C, 75.97; H, 8.05. Found: C, 75.75; H, 8.33.

Mixing 100 milligrams of 11α-hydroxy-1,4-androstadiene-3,17-dione with 0.5 milliliter of acetic anhydride and two milliliters of pyridine, followed by maintaining the mixture for eighteen hours, quenching with fifty milliliters of water, extracting with five 25-milliliter portions of ether, combining the ether extracts and washing twice with ten-milliliter portions of two percent hydrochloric acid, once with ten milliliters of water, once with ten milliliters of two percent sodium bircarbonate, once more with ten milliliters of water, followed by drying with anhydrous sodium sulfate, filtering, and evaporating the solvent to yield 105.5 milligrams of 11α-acetoxy-1,4-androstadiene-3,17-dione, melting point 195–197 degrees centigrade, $[\alpha]_D$ plus 112 degrees.

*Analysis.*—Calcd. for $C_{21}H_{26}O_4$: C, 73.66; H, 7.66. Found: C, 73.35; H, 7.81.

EXAMPLE 4

*11α-hydroxytestosterone*

Twelve liters of the following medium was prepared, containing per liter of solution: $(NH_4)_2SO_4$, two grams; $K_2HPO_4$, 1.0 gram; Cerelose dextrose, thirty grams; $FeSO_4$, 0.01 gram; $MgSO_4$, 0.5 gram; $ZnSO_4$, 0.3 gram; KCl and tap water, 0.5 gram. The medium was heat sterilized and then cooled, and inoculated with a 24-hour growth of Sporotrichum epigaeum A. T. C. C. 7145. After a 24-hour additional growth period with an aeration rate of one liter of air per minute (per twelve liters of medium) there was added three grams of progesterone, dissolved in fifty milliliters of acetone. Incubation and aeration was continued at room temperature for 48 hours.

Extraction, as in Example 1, using equivalently proportioned volumes of solvent afforded 5.75 grams of extractives which were triturated three times with twenty-milliliter portions of ether-hexane 5:1 to give 1.45 grams of crystalline 11α-hydroxytestosterone, melting point 178–182 degrees centigrade; $[\alpha]_D$ plus ninety degrees (chloroform).

Identical results are obtained when progesterone is submitted to fermentative degradation by other Sporotrichum species, such as Sporotrichum sulfurescens, Sp. carnis, Sp. bombycinum, or the like.

Similarly, other substrates of the pregnane series such as desoxycorticosterone, 17α,21-dihydroxy-4-pregnene-3,20-dione (Example 8), 17α-hydroxyprogesterone, 11α-hydroxyprogesterone, 11α,21-dihydroxy-4-pregnene-3,20-dione, all produce the same result, that is, 11α-hydroxytestosterone, in accordance with the above procedure.

EXAMPLE 5

*11α-hydroxyprogesterone*

In the same manner given in Example 4, twelve liters of the same medium were inoculated with a 24-hour growth of Sporotrichum epigaeum A. T. C. C. 7145 and after a 24-hour growth period three grams of progesterone, dissolved in fifty milliliters of acetone was added. The aeration rate was kept to about 1/10 of the rate in Example 4, namely about 100 to 110 milliliters of air per minute. After an incubation period of 48 hours, the extraction was carried out as in Example 1, using equivalently proportioned volumes of solvents. The crude material (about six grams) thus obtained was triturated four times with twenty-milliliter portions of ether-hexane 5:1 to give crystalline 11α-hydroxyprogesterone of melting point 166 to 168 degrees centigrade and rotation $[\alpha]_D^{24}$ plus 180 degrees in chloroform.

EXAMPLE 6

*11α,17β-dihydroxy-1,4-androstadiene-3-one*

Using as in Example 1, a 24-hour growth of Sporotrichum epigaeum A. T. C. C. 7145 in twelve liters of medium as described in Example 4, adding three grams of 21-hydroxy-1,4-pregnadiene-3,20-dione in 100 milliliters of acetone followed by incubation, aeration (600 milliliters per minute) and extraction, four times with three liters of methylene dichloride gave 4.81 grams of extractives. The extractives were triturated three times with twenty-milliliter portions of ether-acetone (5:1) to give 1.22 grams of crystalline 11α,17β-dihydroxy-1,4-androstadien-3-one of melting point 170–174 degrees centigrade.

The same procedure gave the same results with other substrates, namely 1,4-pregnadiene-3,20-dione, 17α,21-dihydroxy-1,4-pregnadiene-3,20-dione, 17β-hydroxy-1,4- androstadien-3-one, and 11α-hydroxy-1,4-pregnadiene-3,20-dione.

A decrease of the aeration rate to about 100 to 120 milliliters per twelve liters of medium in Example 6 with the same substrate, i. e., 21-hydroxy-1,4-pregnadiene-3,20-dione, when all other conditions were equal to those described in this example, yielded 11α,21-dihydroxy-1,4-pregnadiene-3,20-dione.

EXAMPLE 7

*11α,17β-dihydroxy-17α-methyl-4-androsten-3-one*
*(11α-hydroxymethyltestosterone)*

Ten liters of a medium containing one percent Cerelose dextrose, two percent corn steep liquor (sixty percent solids), and tap water, was adjusted to a pH of about five with 25 percent sodium hydroxide solution. Thereto was added ten milliliters of lard oil-octadecanol as an anti-foaming agent. This medium was sterilized for 45 minutes at twenty pounds pressure, allowed to cool to 28 degrees centigrade and inoculated with 0.5 liter of a 72-hour growth of Sporotrichum sulfurescens v. Beyman, which strain was obtained from Centraalbureau voor Schimmelcultur, Baarn, Holland. The medium was agitated with a sweep stirrer at 200 R. P. M., and sterile air admitted through a sparger at a rate of 0.2 liter per minute. After a period of 24 hours' growth at 28 degrees centigrade, the mixture was cooled to twenty degrees centigrade and ten grams of methyltestosterone, dissolved in thirty milliliters of dimethylformamide, was added. The fermentation was stopped after 48 hours. The beer was filtered through a 20-inch Knight-Ware vacuum filter and extracted with four portions of 2.5 liters each of methylene chloride. The combined beer extracts were washed with one liter of two percent sodium bicarbonate, once with two liters of water, and dried with anhydrous sodium sulfate. The extract was thereupon evaporated to dryness in vacuo. The dry residue was dissolved in 100 milliliters of ethyl acetate and thereto was added two grams of activated charcoal. This mixture was filtered through diatomaceous earth (Celite), the filter earth was rinsed with 100 milliliters of hot ethanol and the combined filtrate and rinsings evaporated and concentrated until crystallization started. The mixture was then cooled to room temperature and thereupon refrigerated to between zero and five degrees centigrade in a refrigerator. The thus formed crystals were collected on a filter and dried. A total of 5.1063 grams of 11α-hydroxymethyltestosterone of melting point 154 to 156 was thus obtained.

In other runs, extracting the mycelium as well as the beer, yields of seventy percent of 11α-hydroxymethyltestosterone were obtained from methyltestosterone.

EXAMPLE 8

*11α,17β,21-trihydroxy-4-pregnene-3,20-dione*

One hundred liters of a medium containing one percent Cerelose dextrose, two percent corn steep liquor (sixty percent solids), and tap water, was adjusted to a pH of 4.9 with 5 percent sodium hydroxide solution. Thereto was added 400 milliliters of lard oil-octadecanol as an antifoaming agent. This medium was sterilized for 45 minutes at twenty pounds pressure and inoculated with six liters of a 48-hour growth of *Sporotrichum sulfurescens* v. Beyman, which strain was obtained from Centraalbureau voor Schimmelcultur, Baarn, Holland. The medium was agitated with a sweep stirrer at 200 R. P. M., and sterile air admitted through a sparger at a rate of two liters per minute. After a period of 24 hours, 25 grams of 17α,21-dihydroxy-4-pregnene-3,20-dione (Reichstein's substance S), dissolved in 950 milliliters of hot absolute ethanol, was added. The pH was now 4.9. The fermentation was stopped after 24 hours the pH being then 4.6. The beer was filtered through a 20-inch Knight-Ware vacuum filter. The tank and filter were washed with twenty liters of water. The mycelium on the filter was dried with two portions of twelve liters of acetone and extracted with two portions of twelve liters of methylene chloride. The beer filtrate was extracted once with 24 liters of methylene chloride, a second time with the 48 liters of extract from the mycelium-cake extraction, and twice more with 24 liters each of methylene chloride. The combined beer extracts were washed with 24 liters of water. The extract was concentrated in a precision flash evaporator to approximately one liter, then to dryness under an exhaust hood door. The dry residue was three times triturated with 100 milliliters of 9:1 ether-acetone solution. The remaining solids, crystals of 11α,17α,21 - trihydroxy-4-pregnene-3,20-dione, weighed 16.08 grams and had a melting point of 205 to 210 degrees centigrade.

EXAMPLE 9

*11α,17β-dihydroxy-4-androsten-3-one (11α-hydroxytestosterone)*

Fermenting a dispersion of three grams of 17β,21-dihydroxy-4-pregnene-3,20-dione with *Sporotrichum sulfurescens* A. T. C. C. No. 7159 in twelve liters of medium as described in Example 8, but with an aeration of two liters of air per minute (about 16 percent) followed by extraction, equivalently proportioned, as in Example 1, gave about 1.4 grams of 11α-hydroxytestosterone.

EXAMPLE 10

*11α-hydroxypregnane-3,20-dione*

Fermenting a dispersion of five grams of pregnane-3,20-dione with *Sporotrichum epigaeum* A. T. C. C. No. 7159 in 24-liters of medium as described in Example 1 (aeration being 250 milliliters of air per minute) gave 11α-hydroxypregnane-3,20-dione.

Using an aeration of three liters per minute for 24 liters of medium yielded 11α,17β-dihydroxyetiocholan-3-one.

In the same manner as in Example 10, using aeration rates of 0.5 to two liters per 100 liters of medium and fermenting compounds of the pregnane series with *Sporotrichum sulfurescens* or other species of Sporotrichum results in the following:

(a) 17α-hydroxypregnane-3,20-dione gives 11α,17α-dihydroxypregnane-3,20-dione, (b) 3α,17α-dihydroxypregnan-20-one gives 3α,11α,17α-trihydroxypregnan-20-one, (c) 3β,17α-dihydroxypregnan-20-one gives 3β,11α,17α-trihydroxypregnan-20-one, (d) Pregnane-3β,20-diol gives pregnane-3β,11α,20-triol, (e) Allopregnane-3,20-dione gives 11α-hydroxyallopregnane-3,20-dione.

Using an aeration of about ten liters of air per 100 liters of medium, with all other fermentation conditions equal to those in Example 1 results in:

(a) 17α-hydroxypregnane-3,20-dione giving 11α,17α-dihydroxy - 5β - androstan - 3 - one (11α,17α-dihydroxyetiocholan-3-one), (b) 3α,17α-dihydroxypregnan-20-one giving 3α,11α,17α-trihydroxy-5β-androstane, (c) 3β,17α-dihydroxypregnan-20-one giving 3β,11α,17α-trihydroxy-5β-androstane, (d) Pregnane-3β,20-diol giving 3β,11α,17α-trihydroxy-5β-androstane, (e) Allopregnane-3,20-dione giving 17α-hydroxy-5α-androstan-3-one.

EXAMPLE 11

*11α-hydroxyandrostane-3,17-dione*

In the manner given in Example 1, androstane-3,17-dione is fermentatively oxidized with *Sporotrichum epigaeum* using an aeration rate of fifteen liters of air per minute per 100 liters of medium to give 11α-hydroxyandrostane-2,17-dione.

EXAMPLE 12

*11α-hydroxy-5β-androstane-3,17-dione*

In the same manner given in Example 1, 5β-androstane-3,17-dione (etiocholane-3,17-dione) is fermentatively oxidized with *Sporotrichum sulfurescens* using an aeration of twenty liters of air per minute per 100 liters of medium to give 11α-hydroxy-5β-androstane-3,17-dione.

In the same manner as shown with the compounds of the androstane series of Examples 1 to 3, 11 and 12, other 11α-hydroxylation of compounds in the androstane series containing an 11-methylene group may be made by reacting such compounds with species of the genus Sporotrichum in the presence of air. Since these compounds contain no side-chain the rate of aeration is not critical and varies from 0.5 to 20 liters per minute per 100 liters of medium. In this manner is converted:

(a) Androstane-3β,17β-diol to androstane-3β,11α,17β-triol, (b) 5β - androstane - 3α,17α - diol (etiocholane-3α,17α-diol) to 5β-androstane-3α,11α,17α-triol, (c) 3β,17β-dihydroxy-5-androstene to 3β,11α,17β-trihydroxy-5-androstene, (d) 4-androstene-3,17-dione to 11α-hydroxy-4-androstene-3,17-dione, (e) 17β-hydroxy-5β-androstane-3-one (17β - hydroxyetiocholane-3-one) to 11α,17β-dihydroxy-5β-androstane-3-one.

EXAMPLE 13

*3-ketobisnor-4-cholene-11α,22-diol*

Fermenting a dispersion of three grams of 3-ketobisnor-4-cholene-22-ol with *Sporotrichum sulfurescens* A. T. C. C. No. 7159 in twelve liters of medium as described in Example 1 followed by extraction, equivalently proportioned, as in Example 1, gave 3-ketobisnor-4-cholene-11α,22-diol.

EXAMPLE 14

*11α-hydroxy-3-ketobisnor-4-cholenic acid*

In the same manner as shown in Example 1, but using an aeration of two liters of air per minute per 100 liters of medium with 3-ketobisnor-4-cholenic acid as substrate resulted in 11α-hydroxy-3-ketobisnor-4-cholenic acid.

It is to be understood that the invention is not to

We claim:
1. In a process of 11α-hydroxylating a steroid, the steps comprising: contacting an 11-methylene steroid containing up to 22 carbon atoms with aerobically growing fungus of the genus Sporotrichum until a substantial quantity of 11-hydroxylated steroid is produced in the reaction medium.

2. A process of 11α-hydroxylating of compounds of the pregnane series containing in the 11-position a methylene group which comprises: contacting a pregnane compound with aerobically growing fungus of the genus Sporotrichum and separating the resulting 11α-hydroxylated steroid.

3. A process for the production of 11α-hydroxylated compounds of the pregnane series which comprises: contacting a compound of the pregnane series containing in the 11-position a methylene group with aerobically growing Sporotrichum fungus selected from the species: *sulfurescens, carnis, epigaeum* and *bombycinum*, at a rate of aeration of 0.5 to two liters of air per minute, per 100 liters of medium, and separating the resulting 11α-hydroxylated pregnane compounds.

4. A process for the production of 11α-hydroxyprogesterone comprising: contacting progesterone with aerobically growing *Sporotrichum sulfurescens* at a rate of aeration of 0.5 to two liters of air per minute per 100 liters of medium.

5. A process for the production of 11α,17α,21-trihydroxy-4-pregnene-3,-20-dione which comprises: contacting 17α,21-dihydroxy-4-pregnene-3,20-dione with an aerobically growing *Sporotrichum sulfurescens* at a rate of aeration of 0.5 to two liters of air per minute per 100 liters of medium.

6. A process of 11-hydroxylating and fermentatively degrading the 17-side chain of a compound of the pregnane series which comprises: contacting a compound of the pregnane series containing in the 11-position a methylene group, with an aerobically growing fungus of the genus Sporotrichum at a rate of aeration of five to fifteen liters of air per minute per 100 liters of medium and separating the thus obtained 11α-hydroxylated compound of the androstane series.

7. A process for producing 11α-hydroxytestosterone comprising: contacting progesterone with an aerobically growing *Sporotrichum sulfurescens* at a rate of aeration of five to fifteen liters of air per minute per 100 liters of medium.

8. A process for the 11-hydroxylation of compounds of the androstane series which comprises: contacting a compound of the androstane series having a methylene group in the 11-position with aerobically growing Sporotrichum fungus selected from the species consisting of *S. sulfurescens, S. carnis, S. epigaeum* and *S. bombycinum* and separating the thus obtained 11α-hydroxylated androstane.

9. A process for producing 1-dehydro-11α-hydroxytestosterone comprising: contacting 1-dehydrotestosterone with aerobically growing *Sporotrichum sulfurescens*.

10. A process for producing 11α,17β-dihydroxy-17α-methyl-4-androsten-3-one which comprises contacting methyltestosterone with aerobically growing *Sporotrichum sulfurescens*.

11. A process for producing 11α,17β-dihydroxy-17α-methyl-4-androsten-3-one which comprises: contacting methyltestosterone with aerobically growing *Sporotrichum sulfurescens* v. Beyman in a nutrient medium and separating by extraction the thus produced 11α,17α-dihydroxy-17α-methyl-4-androsten-3-one.

References Cited in the file of this patent
UNITED STATES PATENTS

| | | |
|---|---|---|
| 2,649,400 | Murray et al. | Aug. 18, 1953 |
| 2,649,402 | Murray et al. | Aug. 18, 1953 |
| 2,762,747 | Murray et al. | Sept. 11, 1956 |
| 2,765,258 | Shull | Oct. 2, 1956 |

OTHER REFERENCES

Meister et al.: Jour. Am. Chem. Soc. 76, Aug. 5, 1954, pages 4050, 4051.